United States Patent [19]
Ittycheriah et al.

[11] Patent Number: 5,956,671
[45] Date of Patent: Sep. 21, 1999

[54] APPARATUS AND METHODS FOR SHIFT INVARIANT SPEECH RECOGNITION

[75] Inventors: Abraham Poovakunnel Ittycheriah; Stephane Herman Maes, both of Danbury, Conn.

[73] Assignee: International Business Machines Corporation, Armonk, N.Y.

[21] Appl. No.: 08/868,860

[22] Filed: Jun. 4, 1997

[51] Int. Cl.$^6$ ............................... G10L 3/02; G10L 9/00; G10L 5/06

[52] U.S. Cl. ........................................... 704/203; 704/231

[58] Field of Search ...................... 704/203, 231

[56] References Cited

U.S. PATENT DOCUMENTS 5,623,107  1/1991  Ueda et al. ............................. 704/203

OTHER PUBLICATIONS

*A Nonlinear Squeezing of the Continuous Wavelet Analysis Based on Auditory Nerve Models,* Daubechies et al., Wavelets in Medicine and Biology, edited by A. Alroubi and M. Unser, CRC Press (Jul. 1995, published in Apr. 1996).

*Robust Speech and Speaker Recognition Using Instantaneous Frequencies and Amplitudes Obtained with Wavelet–Derived Synchrosqueezing Measures,* S. Maes, Program on Spline Functions and the Theory of Wavelets, Centre de Recherches Mathematiques, Universite de Montreal, Canada (Mar. 1996).

*Primary Examiner*—David R. Hudspeth
*Assistant Examiner*—Robert Louis Sax

[57] ABSTRACT

The present invention includes a method of generating a set of substantially shift invariant acoustic features from an input speech signal which comprises the steps of: splitting the input speech signal into a plurality of input speech signals; respectively delaying a majority of the input speech signals by a successively incrementing time interval; respectively extracting a plurality of sets of acoustic features from the plurality of input speech signals; summing the plurality of sets of acoustic features to form a set of summed acoustic features; and dividing the set of summed acoustic features by a number equivalent to the number of sets of acoustic features summed in the summing step thereby forming a set of averaged acoustic features which are substantially shift invariant. Further, the present invention may include a method for generating at least one substantially shift invariant speech recognition model from speech training data which comprises the steps of: inputting the speech training data a first time; extracting acoustic features from the speech training data input the first time; inputting the speech training data a plurality of times thereafter, each time respectively delaying the input speech training data by a successively incrementing time interval; respectively extracting acoustic features from each delayed speech training data input each time; and utilizing at least the acoustic features extracted in the extracting steps to form the at least one speech recognition model which is substantially shift invariant. Still further, the present invention may include a synchrosqueezing process in the feature extraction steps. Also, the invention contemplates implementing these processes individually, in combination with another of the processes, and a combination of all the processes.

18 Claims, 5 Drawing Sheets

APPARATUS AND METHODS FOR SHIFT INVARIANT SPEECH RECOGNITION

BACKGROUND OF THE INVENTION

The present invention relates to speech recognition systems and, more particularly, to apparatus and methods for performing shift invariant speech recognition.

Speech recognition is an emerging technology. More and more often it is replacing classical data entry or order taking, which typically require filling out of forms, typing or interacting with human operators. Typically an initial step in a computerized speech recognition system involves the computation of a set of acoustic features from sampled speech. The sampled speech may be provided by a user of the system via an audio-to-electrical transducer, such as a microphone, and converted from an analog representation to a digital representation before sampling. Typically, a classical acoustic front-end (processor) is employed to compute the acoustic features from the sampled speech. The acoustic features are then submitted to a speech recognition engine where the utterances are recognized.

However, it is known that one of the major problems inherent with most speech recognition systems is that they are not translation invariant. In other words, when the sampled speech signal is translated (i.e., shifted) by merely a few milliseconds, the speech recognition system may experience a large variation in performance. That is, an unacceptable recognition error rate may be experienced. It is known that such spurious shifting of the input utterance may be caused by one or more factors, for example, the speaker may pause when speaking into the microphone thereby causing a shift of several milliseconds. While this problem is a result of the discrete character of the signal processing techniques used to extract the acoustic features, no existing system has addressed, no less solved, this issue.

SUMMARY OF THE INVENTION

It is an object of the present invention to provide apparatus and methods for substantially reducing performance variability associated with speech recognition due to speech translation.

In one aspect of the present invention, a method of generating a set of substantially shift invariant acoustic features from an input speech signal comprises the steps of: splitting the input speech signal into a plurality of input speech signals; respectively delaying a majority of the input speech signals by a successively incrementing time interval; respectively extracting a plurality of sets of acoustic features from the plurality of input speech signals; summing the plurality of sets of acoustic features to form a set of summed acoustic features; and dividing the set of summed acoustic features by a number equivalent to the number of sets of acoustic features summed in the summing step thereby forming a set of averaged acoustic features which are substantially shift invariant.

In another aspect of the present invention, a method for generating at least one substantially shift invariant speech recognition model from speech training data comprises the steps of: inputting the speech training data a first time; extracting acoustic features from the speech training data input the first time; inputting the speech training data a plurality of times thereafter, each time respectively delaying the input speech training data by a successively incrementing time interval; respectively extracting acoustic features from each delayed speech training data input each time; and utilizing at least the acoustic features extracted in the extracting steps to form the at least one speech recognition model which is substantially shift invariant. Further, it is to be appreciated that the extracting steps of the unique methods mentioned above may also include a synchrosqueezing process which will be explained below.

As a result, the present invention provides for building of substantially shift invariant acoustic features (i.e., feature vectors) as well as for building substantially shift invariant speech recognition models. These features lead to such significant advantages as: an increased speech database available for training of a speech recognizer; a new front-end processing technique for providing speech recognition which is substantially more robust than conventional speech recognition; improvement of recognition performance without the need to retrain the recognition models; and techniques for retraining the recognition models thereby providing a robust speech recognition system, to name a few.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
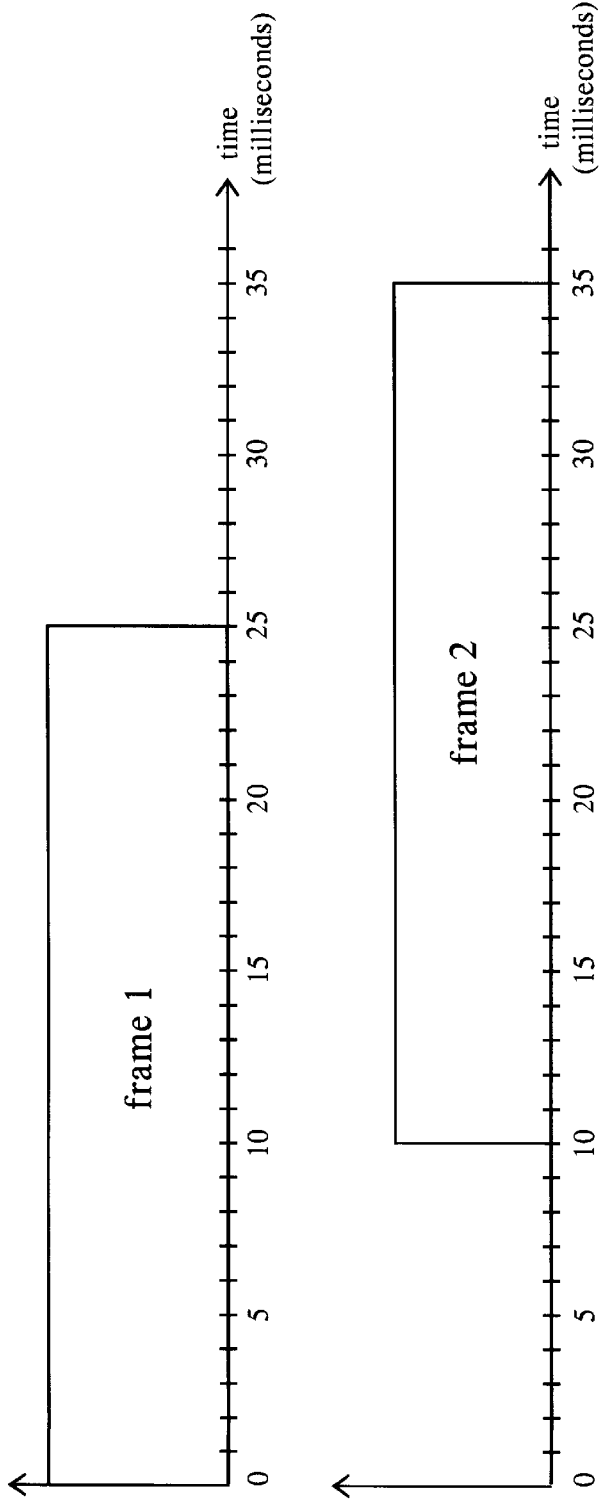
FIGS. 1A & 1B are timing diagrams illustrating a typical timing relationship between consecutive frames in a conventional speech recognition system.

Referring initially to FIGS. 1A and 1B, a typical timing relationship between consecutive frame periods of a conventional speech recognition system is shown. A frame period is defined as a predetermined time period associated with the sampled input speech wherein the input speech falling within that period is processed by the speech recognition system (i.e., acoustic features are generated and then decoded). Typically, a frame period is chosen to be about 25 milliseconds (msec) in duration and, as a result, 25 msec portions of the input speech are processed at a time. FIG. 1A illustrates a first frame of input speech. The second frame processed by the conventional speech recognition system is also 25 msec in duration; however, it is known that it is beneficial to overlap the second frame and the first frame by some duration. As shown in FIG. 1B, it is typical for conventional systems to shift by 10 msec and process the second frame between about 10 msec and 35 msec thereby overlapping the first frame by about 15 msec. Unfortunately, as mentioned above, if there is any spurious shifting in the input speech due to, for example, pauses by the speaker during inputting of the speech or delays introduced by the input channel or the analog-to-digital converter which samples the input speech waveform, then the conventional shifting process may lead to substantial recognition errors thereby reducing the accuracy and, thus, performance of the recognition system.

The present invention provides apparatus and methods for substantially reducing performance variability due to such spurious translation of the input speech. Generally, instead of the conventionally method of generating a set of acoustic features for the first frame and then fully shifting, for example, by about 10 msec and generating a set of acoustic features for the second frame, the present invention provides for generation of a set of acoustic features for the first frame and then provides for incremental shifting of the frame by smaller time periods, that is, smaller than a full shift (e.g., 10 msec) whereby a set of acoustic features is generated for each incrementally shifted frame. Then, an average set of acoustic features is calculated from the incremental frame sets such that the average set of acoustic features represents the second frame. Likewise, for subsequent frames, rather than shifting by a full 10 msec, as conventionally done, the same incremental frame shifting and averaging process is performed to generate the set of acoustic features for each next frame.

For instance, rather than calculate a set of acoustic features for a second frame shifted by 10 msec with respect to the previous frame, respective sets of acoustic features may be calculated for a frame shifted by 0 msec (no shift), a frame shifted by 3 msec, a frame shifted by 6 msec and a frame shifted by 10 msec. These sets are then averaged and the average set of acoustic features becomes the set which represents the second frame. The third frame would then be formed from incremental frames shifted by about 10, 13, 16, and 20 msec, respectively, and so on for subsequent frames. Also, as will be shown and explained, the increments may be smaller thus yielding a greater number of incremental sets used to calculate the average set. It is important to note that the actual time shifts between incremental frames is not limited to shifts of 1 msec or 3 msec, but rather may be any value of incremental time shifts between the starting point of the previous frame and the otherwise full shift associated with a subsequent frame. For that matter, even though a frame has been illustrated as having a duration of 25 msec and a typical full shift between frames as being 10 msec, it should be understood that these are merely exemplary values and, therefore, frame durations and overall shifts between frames may be greater and/or less than such values.

Figure 2:
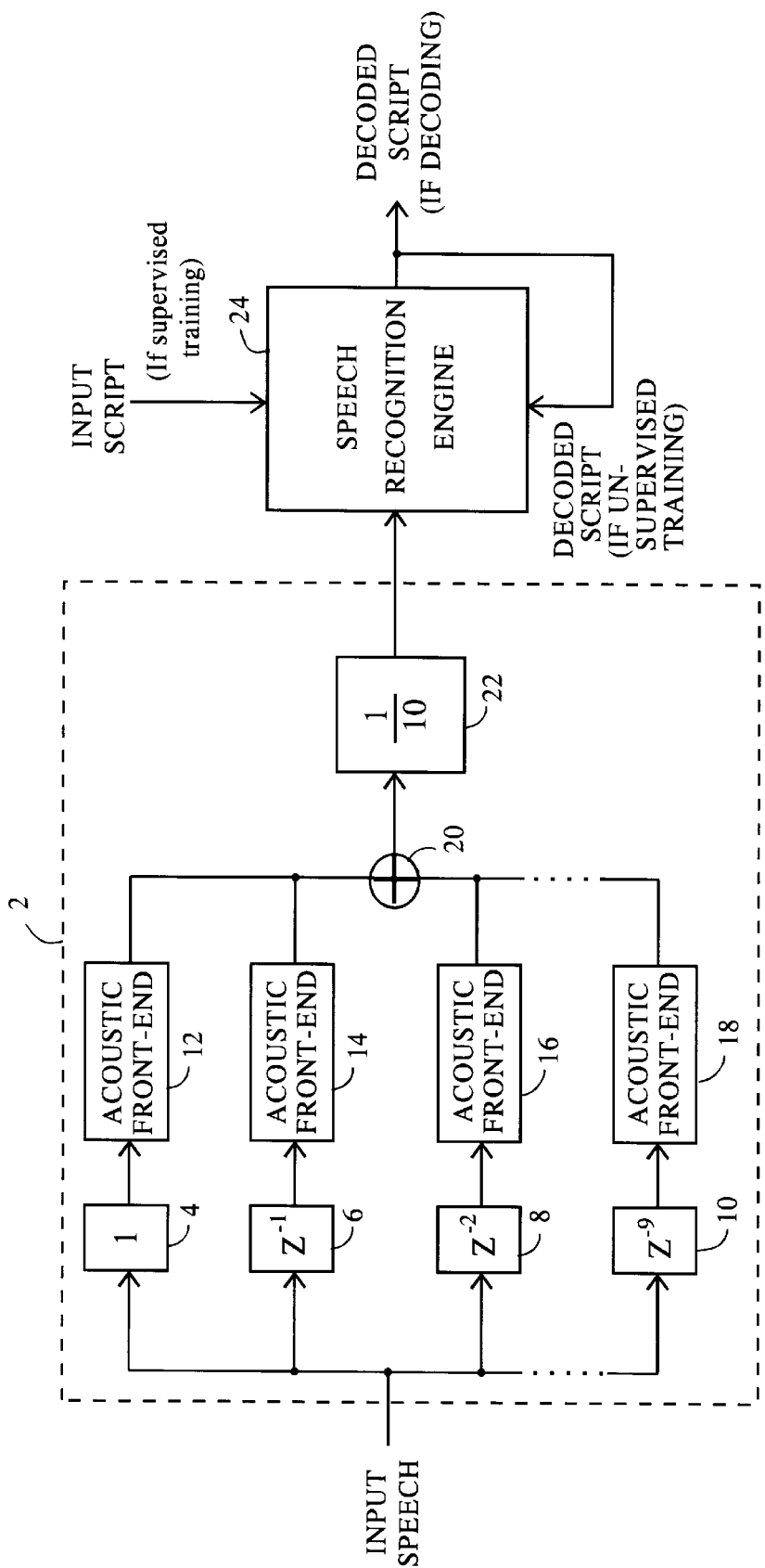
FIG. 2 is a block diagram illustrating one aspect of a shift invariant speech recognition system according to the invention.

Referring now to FIG. 2, a first embodiment for implementing the invention is shown. Specifically, a composite acoustic front-end 2 is operatively coupled to a source of input speech and to a speech recognition engine 24. An acoustic front-end is also generally referred to as a feature extractor since it serves the function of extracting acoustic features from sampled input speech. The composite acoustic front-end 2 performs the incremental frame shifting and averaging process mentioned above. The composite acoustic front-end 2, itself, includes a plurality of delay units 4–10, a plurality of acoustic front-ends 12–18, a summer 20 and a divider 22. It is to be understood that, although not shown, there are several more delay units between delay unit 8 and delay unit 10 and there are several more acoustic front-ends between acoustic front-ends 16 and 18. This will be explained below. Further, in this particular embodiment, the acoustic front-ends may be conventional acoustic front-ends or feature extractors.

The delay units are operatively coupled to the source of input speech, while the acoustic front-ends are respectively operatively coupled to the delay units. Also, the acoustic front-ends are operatively coupled to the summer 20, which is also operatively coupled to the divider 22. The divider 22 is operatively coupled to the speech recognition engine 24. Although not specifically shown, splitting means is preferably imposed between the source of input speech and the delay units so that each delay unit may receive the same input speech. Given the above description of component interconnection, an explanation of the operation of such a first embodiment will follow below in conjunction with FIGS. 2 and 3A through 3D.

It is to be appreciated that the embodiment illustrated in FIG. 2 implements a composite acoustic front-end which provides for a frame duration of about 25 msec and incremental frame shifts of multiples of about 1 msec such that respective sets of acoustic features are calculated with no shift (0 to 25 msec), 1 msec shift (0 to 25 msec), 2 msec shift (1 to 26 msec), 3 msec shift (2 to 27 msec) and so on up to a 9 msec shift (9 to 34 msec). However, for the sake of clarity, only apparatus for providing no shift, 1 msec shift, 2 msec shift and a 9 msec shift as well as corresponding apparatus for performing acoustic feature extraction are shown. The dotted lines are used to indicate the portion of the composite front-end 2 not explicitly shown but which provides the additional shifts and extraction functions.

Figure 3A:
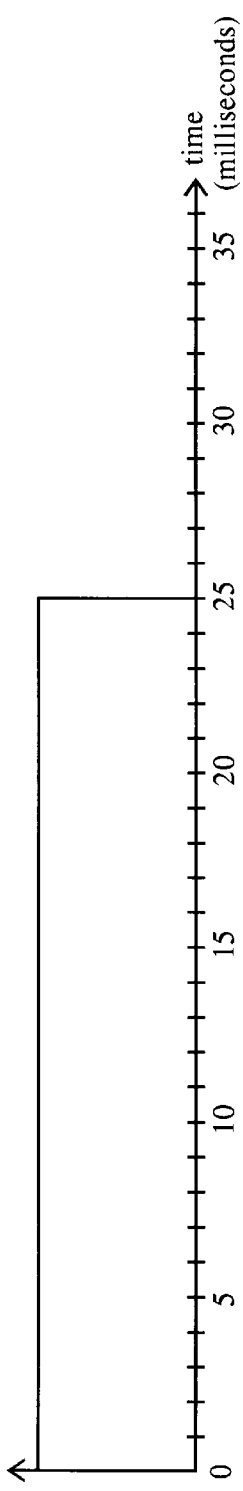
FIGS. 3A through 3D are timing diagrams illustrating an exemplary frame timing relationship according to the invention.

Accordingly, the input speech, which may be in the form of sampled digital speech such as pulse code modulated (PCM) speech, is presented to the delay units. Delay unit 4 imposes no delay on the input speech before presenting the input speech to acoustic front-end 12. Thus, the input speech could alternatively be presented directly to acoustic front-end 12; however, delay unit 4 is illustrated for uniformity and consistency with the other speech paths. The resulting waveform of the frame output from delay unit 4 is shown in FIG. 3A. As mentioned above, the acoustic front-ends within the composite acoustic front-end 2 may be of the type known in the art and, preferably, are of the type which generate a set of mel cepstral type acoustic features for each frame of input speech. However, the type of acoustic features extracted from the input speech are not critical to the invention.

Figure 3B:
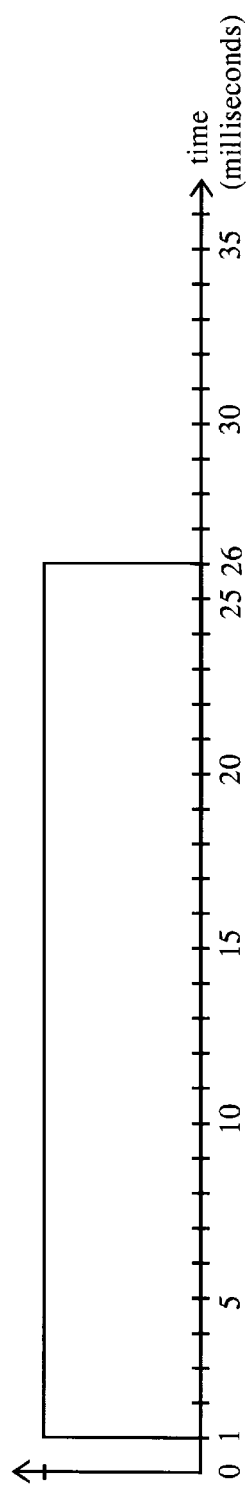
Figure 3C:
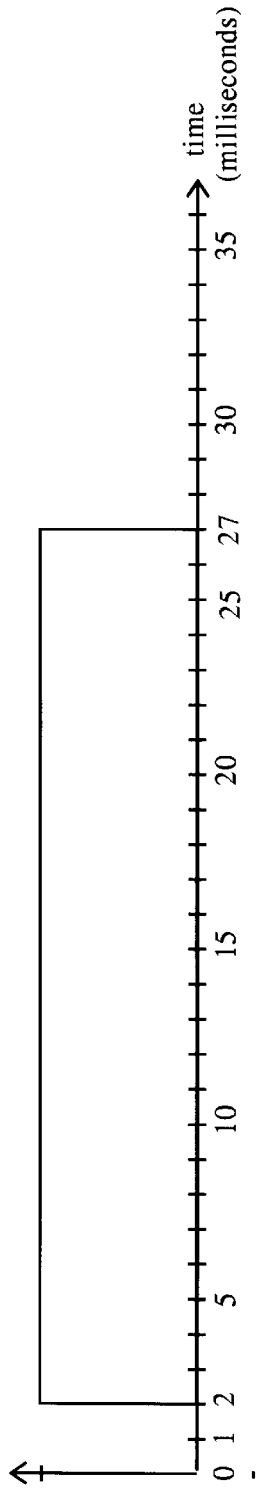
Figure 3D:
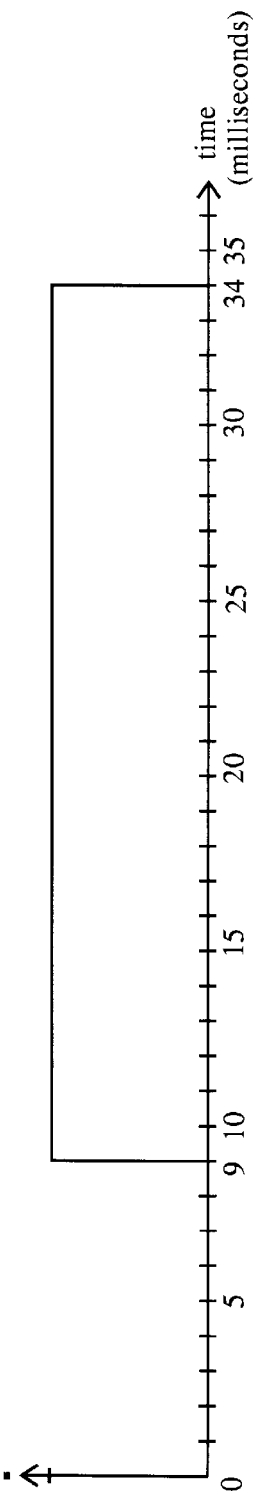

Further, delay unit 6 imposes about a 1 msec delay on the input speech as shown in FIG. 3B, delay unit 8 imposes about a 2 msec delay on the input speech as shown in FIG. 3C, and each subsequent delay unit (not shown) imposes a delay incremented by about 1 msec as compared to the preceding delay unit up to about a 9 msec delay imposed by delay unit 10 as shown in FIG. 3D. As a result, incrementally shifted frames of input speech are respectively presented to the acoustic front-ends wherein sets of acoustic features are respectively extracted. The sets of acoustic features are summed in summer 20 to form a set of summed acoustic features. The set of summed acoustic features is then presented to divider 22 wherein the set of acoustic features is divided by the total number of sets of summed acoustic features provided thereto from the delay units, in this example, ten. Thus, a set of averaged acoustic features is presented to the speech recognition engine 24 wherein the acoustic features are decoded in accordance with speech recognition models and the speech sample is recognized.

It is to be understood that the speech recognition engine 24 may be a conventional engine, as is known in the art. Typically, such an engine may operate in conjunction with known training procedures for creating and training speech recognition models. For instance, in a supervised training mode of operation, the actual speech input to the system is known (i.e., input script) and the system is trained by a potential user who inputs the input script by reading it into the system. In an unsupervised training mode of operation, there is no input script; however, the speech decoded by the engine is presented back to the engine in order to provide an adaptive training function. It is to be appreciated that either supervised training, unsupervised training or a combination thereof may be employed in this embodiment of the present invention.

The embodiment described above with respect to FIG. 2 is a convenient method of implementing translation invariance at a rather low overhead in terms of computation time. Such a front-end processing technique is performed at all times, that is, during training and/or testing (i.e., actual usage). It is to be understood that although retraining of the speech recognition models utilized by the speech recognition engine may be useful, it is not necessary to retrain the models in order to provide the advantageous translation invariance of the invention.

Figure 4A:
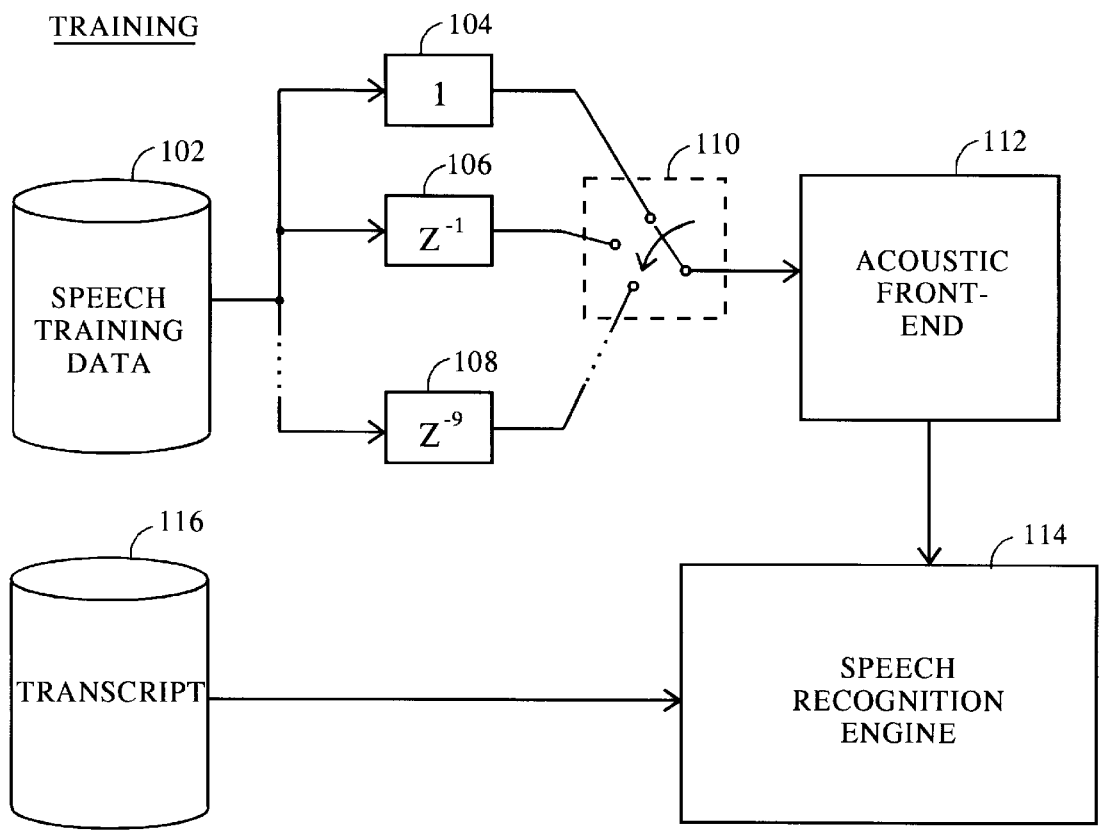
FIGS. 4A & 4B are block diagrams illustrating another aspect of a shift invariant speech recognition system according to the invention.
Figure 4B:
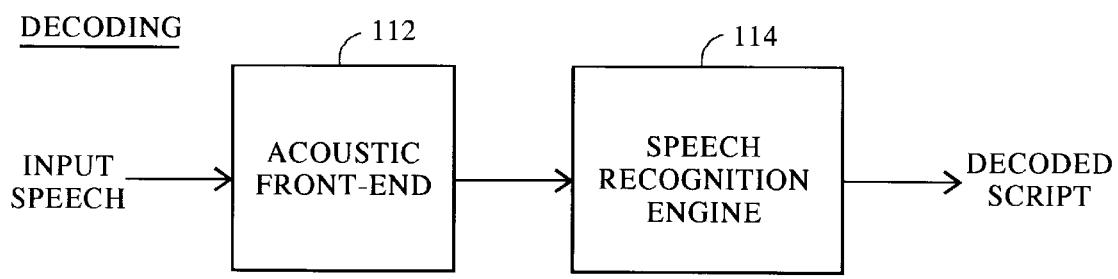

Referring now to FIGS. 4A and 4B, another implementation of the present invention is shown. While the implementation discussed in connection with FIG. 2 is a front-end shift averaging process, the implementation shown in FIG. 4A is directed to a shift training process. In a typical training procedure, a potential user of a speech recognition system reads a body of speech training data into the system whereby acoustic features are extracted and provided to a speech recognition engine to form the speech recognition models. A transcript of the speech training data is also provided to the engine to create the models, as is known in the art.

However, in accordance with the present invention, as shown in FIG. 4A, a training process may be adapted such that performance variation due to spurious translation in both the conventional training process and subsequent testing (usage) of the system may be substantially reduced. Specifically, the speech training data which is stored in speech training data store 102 is input to delay units 104–108, which are similar to the delay units shown in FIG. 2. Thus, each delay unit preferably imposes a multiple of about 1 msec delay on speech input thereto (with the exception of delay unit 104) such that similar outputs as those respectively shown in FIG. 3A through 3D are generated. Again, as with FIG. 2, all the delay units are shown for the sake of simplicity. In any case, all the delay units are coupled to switching unit 110 which is operatively coupled to an acoustic front-end 112. Acoustic front-end 112 is operatively coupled to a speech recognition engine 114 which is also operatively coupled to a transcript store 116.

During the unique training process, switching unit 110 is set such that delay unit 104, which imposes no shift, is operatively coupled to the acoustic front-end 112. The training data is input by the user (read into the microphone) and the data is presented to the acoustic front-end 112 via delay unit 104 where a set of acoustic features are extracted. The acoustic features are then provided to engine 114. Next, the switching unit 110 is set such that delay unit 106, which imposes about 1 msec shift, is operatively coupled to the acoustic front-end 112. Again, the training data is input, shifted by about 1 msec and a set of acoustic features generated and provided to engine 114. This process continues for each delay unit such that the training data is input to the system through each delay unit and then acoustic features extracted for each shifted version of the training data. Significantly, in this manner, the speech recognition engine systematically learns the actual variations due to the incremental translations.

It is to be appreciated that such systematic training can be performed using the same set of training data or different sets. During testing (usage) of a system such as described above, actual recognition may be accomplished in a conventional manner, as shown in FIG. 4B. That is, a single conventional acoustic front-end 112 may be used to extract acoustic features from input speech, but the acoustic features are then presented to the unique speech recognition engine 114 which has been trained over different translated versions of training data. In this way, any spurious translation of input speech during actual usage is processed by engine 114 and the otherwise adverse effects of spurious translation are substantially reduced due to the novel manner of training the system, as described above. Such a shift training method accurately defines the translation mixtures, does not impose any computational overhead during testing and systematically generates a substantial amount of pertinent data for training.

Figure 5:
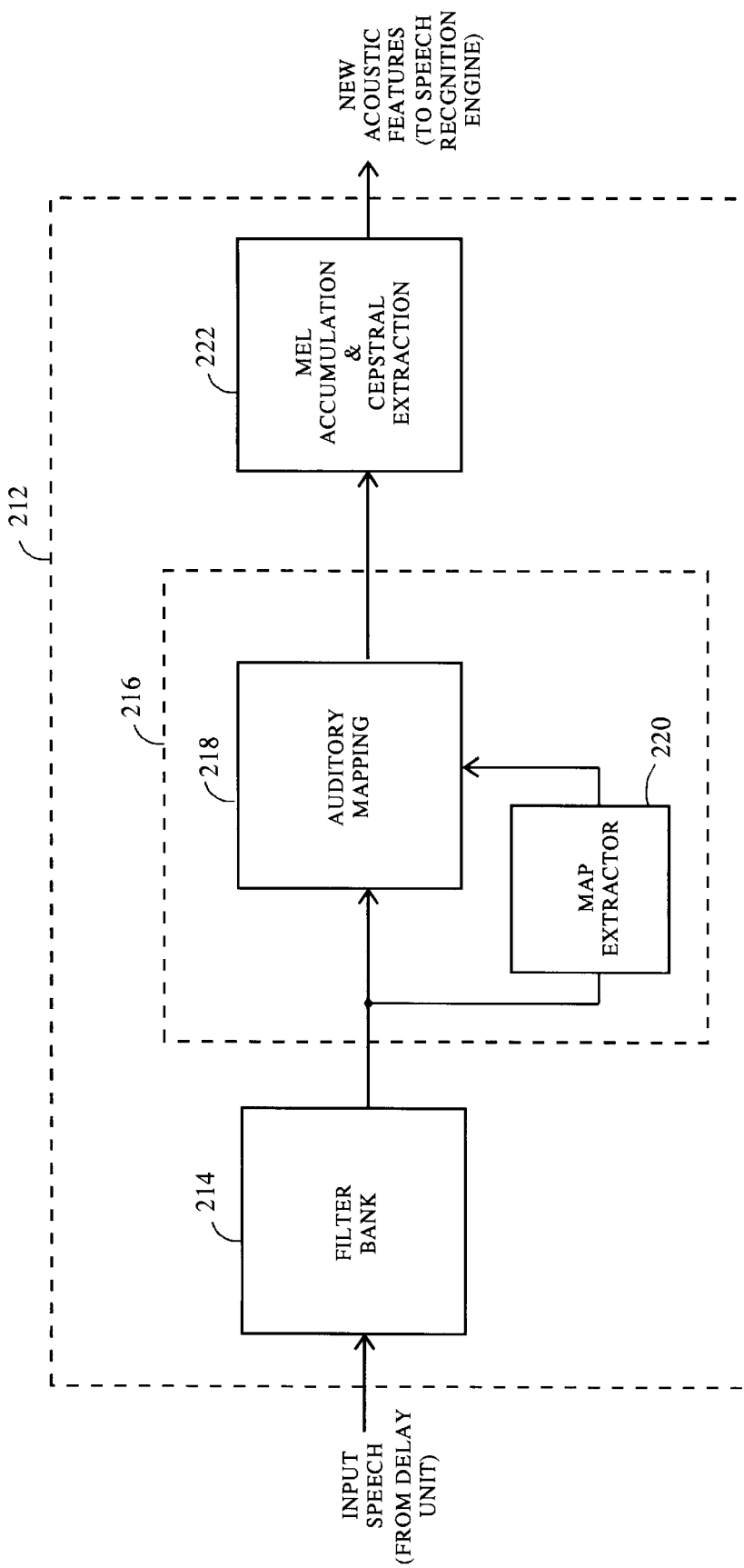
FIG. 5 is a block diagram illustrating yet another aspect of a shift invariant speech recognition system according to the invention.

Referring now to FIG. 5, yet another implementation of the present invention is shown. Specifically, FIG. 5 illustrates an acoustic front-end 212 which performs a process known as synchrosqueezing. The synchrosqueezing process is disclosed in detail in the following publications and disclosures: I. Daubechies and S. Maes, "A Nonlinear Squeezing of the Continuous Wavelet Analysis Based on Auditory Nerve Models," Wavelets in Medicine and Biology, edited by A. Alroubi and M. Unser, CRC Press (July 1995, published in April 1996); S. Maes, "Robust Speech and Speaker Recognition Using Instantaneous Frequencies and Amplitudes Obtained with Wavelet-derived Squeezing Measures," invited lecture and paper, Program on Spline Functions and the Theory of Wavelets, Centre de Recherches Mathématiques, Université de Montreal, Canada (March 1996); "The Wavelet Transform in Signal Processing, with Application to the Extraction of the Speech Modulation Model Features," PhD dissertation Université Catholique de Louvain, Louvain-la-Neuve, Belgium (1994); and S. Maes, "Fast Quasi-continuous Wavelet Algorithms for Analysis and Synthesis of 1-D Signals," to be published October 1997, vol. 57, SIAM Journal on Applied Mathematics. It is to be appreciated that a plurality of such acoustic front-ends 212 may replace the plurality of acoustic front-ends 12–18 shown in FIG. 2. In this manner, not only does such an embodiment perform the front-end shift averaging process described with respect to FIG. 1, but it also provides the benefits inherent with the synchrosqueezing process.

Particularly, the synchrosqueezing process involves rearrangement of the time-frequency plane on the basis of a derivative of a phase of a Fourier transform performed during formation of the acoustic features and according to an auditory nerve representation associated with the input speech. As shown in FIG. 5, a filter bank 214 is operatively coupled to an auditory mapping unit 218 and a map extractor 220. The auditory mapping unit 218 is also operatively coupled to mel accumulation and cepstral extraction unit 222. It is to be understood that the actual synchrosqueezing is performed by the auditory mapping unit 218 and the map extractor 220, the combination of which is denoted as block 216. Also, as mentioned, since a plurality of acoustic front-ends 212 are employed in place of the plurality of acoustic front-ends 12–18 of FIG. 1 in order to form this particular embodiment, it is to be understood that the input to the filter bank 214 is from whichever delay unit the front-end 212 is coupled to and, further, the mel accumulation and cepstral extraction unit 222 is coupled to the corresponding speech recognition engine.

The filter bank 214 is a Q-constant filter bank (i.e. the filters are obtained by dilation of each other), modeling the frequency sensitivity of the cochlea. Such filters can easily be implemented with a quasi-continuous wavelet transform.

The synchronized random neural firing of the inner hair cells along the cochlea and the resulting signal transmitted to the auditory nerve is modeled by a non-linear mapping (re-arrangement of the time-frequency plane) unit 218. The rearrangement is phase-derived and parameterized by estimates (done in block 220) of the derivative of the phase which define a pseudo-frequency. Other estimators of the pseudo-frequency can be used: auto-correlation, zero-crossing rates, etc. Essentially, coherent structures within the signal (e.g. formants in voiced regions) are reinforced while incoherent structures are dissipated in the time-frequency plane. The new time-frequency plane is called a synchro-squeezed plane (done in block 216). Within this plane, in block 222, we accumulate the norm of the spectrum over different region according to the mel process mentioned earlier. Once this is done, cepstra can be extracted following the classical approach. Note that the synchrosqueezing process can be performed directly on the Fourier spectrum or other time-frequency representations instead of the wavelet transform with no change of the above mentioned principle.

The resulting acoustic features output from an acoustic front-end 212 are very similar to typical mel cepstral features but, in this case, are computed by energy accumulation over the resulting time-frequency plane. Again, although retraining of the speech recognition models may be useful, it is not necessary to do so in order to achieve the benefits of such a shift invariant system.

Since the synchrosqueezing process is substantially invariant under translation and given the shift invariance associated with the front-end shift averaging process of the invention, a speech recognition system which substantially reduces performance variability is advantageously formed.

Yet another implementation of the present invention involves employing the acoustic front-end 212 in the shift training process described with respect to FIGS. 4A and 4B. That is, the acoustic front-end 212 may replace the acoustic front-end 112 employed in the embodiment of FIGS. 4A and 4B. Thus, a method of training the synchrosqueezed acoustic features over translated versions of the speech training data stored in store 102 is provided by the invention.

It is to be appreciated that the implementations of the invention described herein can be provided individually or combined in a variety of combinations. That is, for instance, the synchrosqueezing process may be implemented with either the front-end shift averaging process or the shift training process, as mentioned above, or the shift averaging and shift training processes may be combined, or all three processes may be implemented together.

It is to be further appreciated that the components of the embodiments described herein may be implemented in hardware, software or a combination thereof. Preferably, the preferred embodiments are implemented on an appropriately programmed general purpose digital computer.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of generating a set of substantially shift invariant acoustic features from an input speech signal, the method comprising the steps of:

(a) splitting the input speech signal into a plurality of input speech signals;

(b) respectively delaying a majority of the input speech signals by a successively incrementing time interval;

(c) respectively extracting a plurality of sets of acoustic features from the plurality of input speech signals;

(d) summing the plurality of sets of acoustic features to form a set of summed acoustic features; and (e) dividing the set of summed acoustic features by a number equivalent to the number of sets of acoustic features summed in step (d) thereby forming a set of averaged acoustic features which are substantially shift invariant.

2. The method of claim 1, wherein step (c) further comprises the step of respectively rearranging a time-frequency plane associated with each set of acoustic features according to a derivative of a phase of a Fourier transform performed thereon and according to an auditory nerve representation associated with the input speech signal.

3. The method of claim 1, further comprising the step of decoding the set of averaged acoustic features in order to generate a decoded script representative of the input speech signal.

4. The method of claim 1, wherein all but one of the plurality of input speech signals are respectively delayed by a successively incrementing time interval.

5. The method of claim 4, wherein the time intervals associated with the delayed input speech signals are multiples of about one millisecond.

6. A method for generating at least one substantially shift invariant speech recognition model from speech training data, the method comprising the steps of:

(a) inputting the speech training data a first time;

(b) extracting acoustic features from the speech training data input the first time;

(c) inputting the speech training data a plurality of times thereafter, each time respectively delaying the input speech training data by a successively incrementing time interval;

(d) respectively extracting acoustic features from each delayed speech training data input each time; and (e) utilizing at least the acoustic features extracted in steps (b) and (d) to form the at least one speech recognition model which is substantially shift invariant.

7. The method of claim 6, wherein one of step (b) and (d) further comprises the step of rearranging a time-frequency plane associated with the acoustic features according to a derivative of a phase of a Fourier transform performed thereon and according to an auditory nerve representation associated with the input speech training data.

8. The method of claim 6, further comprising the step of decoding a set of acoustic features extracted from an input speech signal utilizing the at least one substantially shift invariant speech recognition model in order to generate a decoded script representative of the input speech signal.

9. The method of claim 6, wherein the time intervals associated with the delayed speech training data are multiples of about one millisecond.

10. Apparatus for generating a set of substantially shift invariant acoustic features from an input speech signal, the apparatus comprising:

splitting means for splitting the input speech signal into a plurality of input speech signals;

a plurality of delay units responsive to the splitting means for respectively delaying at least a majority of the input speech signals by a successively incrementing time interval;

a plurality of feature extractors for respectively extracting a plurality of sets of acoustic features from the plurality of input speech signals;

summing means responsive to the plurality of feature extractors for summing the plurality of sets of acoustic features to form a set of summed acoustic features; and dividing means responsive to the summing means for dividing the set of summed acoustic features by a number equivalent to the number of sets of acoustic features summed by the summing means thereby forming a set of average acoustic features which are substantially shift invariant.

11. The apparatus of claim 10, wherein each one of the plurality of feature extractors further includes means for rearranging a time-frequency plane associated with the set of acoustic features according to a derivative of a phase of a Fourier transform performed thereon and according to an auditory nerve representation associated with the input speech signal.

12. The apparatus of claim 10, further comprising a speech recognition engine for decoding the set of averaged acoustic features in order to generate a decoded script representative of the input speech signal.

13. The apparatus of claim 10, wherein all but one of the plurality of input speech signals are respectively delayed by a successively incrementing time interval.

14. The apparatus of claim 13, wherein the time intervals associated with the delayed input speech signals are multiples of about 1 msec.

15. Apparatus for generating at least one substantially shift invariant speech recognition model from speech training data stored in a speech training data store, the apparatus comprising:

splitting means for splitting the speech training data into a plurality of speech training data sets;

a plurality of delay units responsive to the splitting means, at least a majority of the delay units for respectively delaying the set of speech training data input thereto by a successively incrementing time interval;

switching means selectively coupled to the plurality of delay units; and a feature extractor responsive to the switching means for extracting acoustic features;

wherein the speech training data is successively provided to the feature extractor through each one of the delay units and the switching means in order to respectively extract acoustic features therefrom such that the acoustic features extracted by the feature extractor are utilized to form the at least one speech recognition model which is substantially shift invariant.

16. The apparatus of claim 15, wherein the feature extractor further comprises means for rearranging a time-frequency plane associated with the acoustic features according to a derivative of a phase of a Fourier transform performed thereon and according to an auditory nerve representation associated with the input speech training data.

17. The apparatus of claim 15, further comprising a speech recognition engine for decoding a set of acoustic features extracted from an input speech signal by utilizing the at least one substantially shift invariant speech recognition model in order to generate a decoded script representative of the input speech signal.

18. The apparatus of claim 15, wherein the time intervals associated with the delayed speech training data are multiples of about 1 msec.

* * * * *